United States Patent
Hui

(10) Patent No.: US 8,745,917 B2
(45) Date of Patent: Jun. 10, 2014

(54) ANT TRAP

(76) Inventor: Wing-kin Hui, Hong Kong (HK)

( * ) Notice: Subject to any disclaimer, the term of this patent is extended or adjusted under 35 U.S.C. 154(b) by 0 days.

(21) Appl. No.: 12/761,722

(22) Filed: Apr. 16, 2010

(65) Prior Publication Data

US 2011/0252693 A1    Oct. 20, 2011

(51) Int. Cl.
*A01M 1/24* (2006.01)
*A01M 1/20* (2006.01)
*A01M 1/10* (2006.01)

(52) U.S. Cl.
USPC .................................. 43/131; 43/121; 43/107

(58) Field of Classification Search
USPC ................. 43/132.1, 131, 107, 121, 110, 111
See application file for complete search history.

(56) References Cited

U.S. PATENT DOCUMENTS

| | | | | |
|---|---|---|---|---|
| 5,369,908 A | * | 12/1994 | Morales | 43/111 |
| 5,914,105 A | * | 6/1999 | Barcay et al. | 424/84 |
| 6,651,378 B2 | * | 11/2003 | Baker | 43/131 |
| 7,076,915 B1 | * | 7/2006 | Brooks et al. | 43/132.1 |

* cited by examiner

*Primary Examiner* — Darren W Ark
*Assistant Examiner* — Kathryn L Thompson
(74) *Attorney, Agent, or Firm* — Peninsula IP Group; Douglas Chaikin

(57) ABSTRACT

Disclosed herein is an improved ant trap. The ant trap includes a base having a central opening and the opening is suitable for storing liquid. A bait trap is located centrally within the central opening to maximize the number of ants in the central opening at any point in time. The ant trap, in an exemplary embodiment, includes an electromechanically operated platform, which is movable with respect to the central opening. In a first position the platform forms an ant path from the base to the bait trap. In a second position the platform is moved into the central opening. The central opening is filed with a liquid toxic to ants, but safe to mammals and the environment, generally. For example, a solution of sweet boric acid and water is used to fill the central opening. Upon moving, the platform is immersed in the liquid, thereby exterminating ants found thereon.

6 Claims, 5 Drawing Sheets

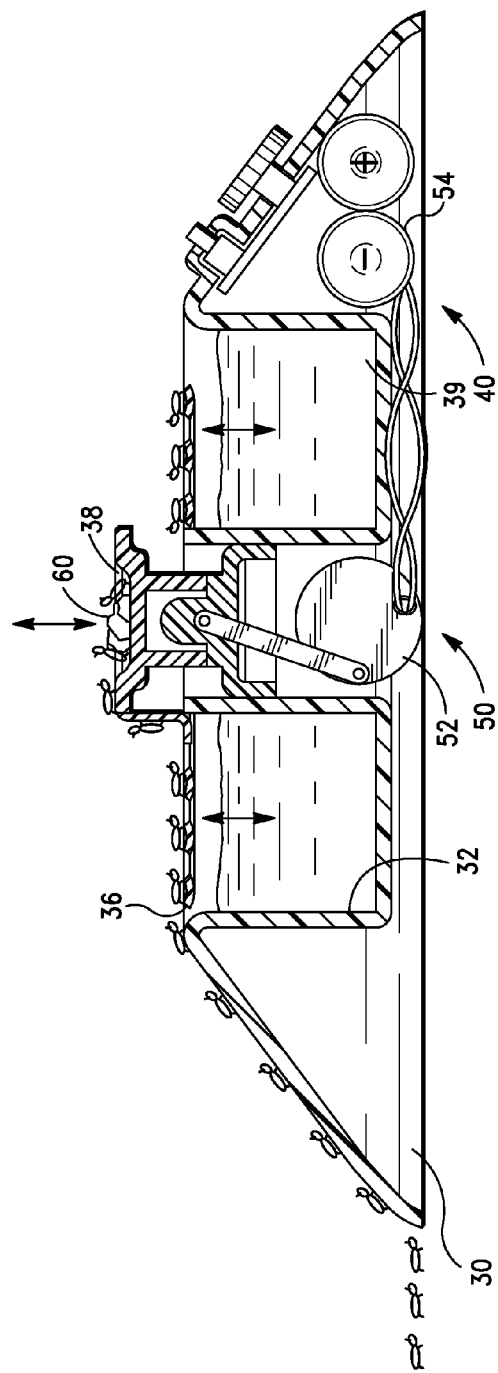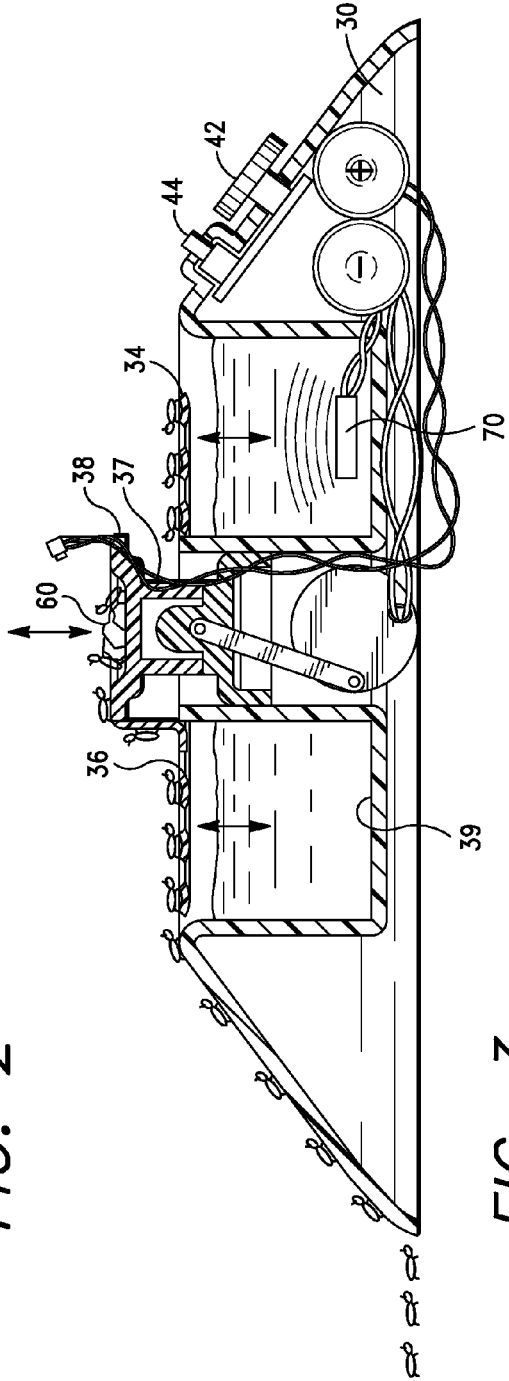

US 8,745,917 B2

ANT TRAP

FIELD OF THE INVENTION

This invention relates generally to the field of safe and effective pest elimination. More particularly, this invention relates to ant-pest elimination and uses a combination of a device and safe chemical component.

BACKGROUND OF THE INVENTION

Generally, we consider ants to be pests when found inside a house. However, ants are a beneficial insect when found in their natural environment. Ants dispose of dead and decaying plant and animal organic matter. Ant nests aerate the soil.

As is well known, ants will eat just about anything, which is one reason they're such pests inside a residence. Ants, in great numbers, will carry back meat, sweets, plant and/or animal materials to their nests. Foods containing greasy proteins or sugars are especially attractive to ants. Such foods can draw ants in large numbers.

As is well understood, the ants foraging in the residence are worker ants charged with bringing food back to their colony mates. As is also well, known, such worker ants leave behind a trail for their nest mates to follow by depositing a pheromone as they walk. Unless purposely removed, the pheromone trail stays in place for a long, long time.

Various chemical insecticides have been found to effectively kill ants for a short period of time. As homeowners know, the initial kill doesn't last long enough. After a while, the ants return in at least in the same numbers as before. While the ant problem hasn't gone away, the environment may have been detrimentally affected. Various pesticides can last 50 years or more and create havoc in the environment.

Other non-toxic approaches have also been attempted and are just good common sense for any ant infestation. Such approaches include the following:

Storing all attractive food items such as any sugars, syrup, and honey in closed containers;
Rinsing out soft-drink containers before placing food items in the trash;
Cleaning up grease splatters and spills as soon as they happen;
Resisting the convenience of free-feeding pets—ants find kibbled animals foods especially irresistible; and
Scrubbing ant entry points with soap and water—this removes trail pheromones and make it more difficult for foragers to find previous trails.

Ants will not eat bait, if foods, as described above are nearby and easily foragable. For the best results, sinks, pantries, and other areas of possible ant-infestation, should be free of food particles and other ant-attractive substances.

There is no question that ants are an annoyance when found inside a residence. They are unsightly and give the homeowner a feeling that he's been invaded by an alien species. It is quite a ghastly sight, first thing in the morning, to see 10,000 or more ants chopping down on leftover pizza from the previous night. It's enough to make one miss the first and most important meal of the day.

On the other hand, ants are beneficial outside the home and there is no reason to poison them to extinction, should such even be possible. Thus, there is a need for non-toxic methods of eliminating the ant pest from homes without poisoning the environment What is needed is an environmentally friendly, non toxic method of eliminating ants, whether they be found in a residence or plant garden or any other undesirable locations.

SUMMARY OF THE INVENTION

The structure for an improved ant trap in accordance with the present invention takes different forms. In some embodiments, the ant trap includes electro-mechanical devices, where a motor moves the platform having an ant path into a liquid toxic to ants, but environmentally safe. In another exemplary embodiment, there is only a passiVe trap, which is triggered .by the weight of the ants themselves. Finally, yet another embodiment includes a platform, which remains passive which the liquid is cycled.

It is an object of this invention is to provide an environmentally safe and effective method of eliminating ant-pest in the home.

It is another object of this invention to provide an ant trap, which can be used safely around pets and humans, while effectively eliminating ant infestations.

In accordance with the objects set forth above and as will be described more fully below, the ant trap in accordance with this invention, comprises:

a base having a central opening and the central opening suitable for storing liquid;
a bait trap located within the central opening; and
a platform movable with respect to the central opening, in a first position the platform forms an ant path from the base to the bait trap, in a second position, at least a portion of the platform moves within the central opening;
whereby upon filling the central opening with a liquid and upon selectively moving the platform into the liquid the ant path immersed in the liquid for exterminating ants.

In another exemplary embodiment, the ant trap, comprises:
a base;
a platform movable with respect to the base;
a bait trap located on the platform, an ant path is defined from the base along the platform to the bait trap; and
a sweeper mechanism for gathering ants on the ant path as the platform moves with respect to the base.

In another exemplary embodiment, the ant trap, comprises:
a base having a central opening and the opening suitable for storing liquid;
a platform movable with respect to the base, the platform being balanced with respect to the base and pivotable thereto, the platform having pivot points located asymmetrically with relation to the base;
a bait trap located on the platform, the bait trap aiding in balancing the platform with respect to the base, the ant path is defined from the base along the platform to the bait trap;
the balance of the platform being such that the weight of a sufficient number of ants on the platform, causes the platform to tilt into the central opening; and
whereby upon filling the central opening with a liquid and upon the balance being upset, the platform pivots and the ant path is at least partially immersed in the liquid for exterminating ants.

In another exemplary embodiment, the ant trap, comprises:
a base having a central opening and the, opening suitable for storing liquid;
a platform located proximate to the central opening;
a bait trap located on the platform and elevated above the platform; and
a reservoir connected to the base and communicating with the central opening, the reservoir having a valve for selective communication with the central opening;

a pump member for pumping liquid from the central opening back to the reservoir.

It is an advantage of the ant trap in accordance with the instant invention to provide a safe and effective means for eliminating ant infestations.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIGS. 1-3 illustrate the first two exemplary embodiments of the ant trap in accordance with this invention.

DETAILED DESCRIPTION OF THE INVENTION

In order to appreciate the invention herein, one must appreciate the need in the art as set forth in the Background. Most importantly, the structure herein for resolving the long felt need to eliminate ant pest infestations in the home without causing environmental damage is represented by the various exemplary embodiments in accordance with the disclosed invention.

Figure 1:
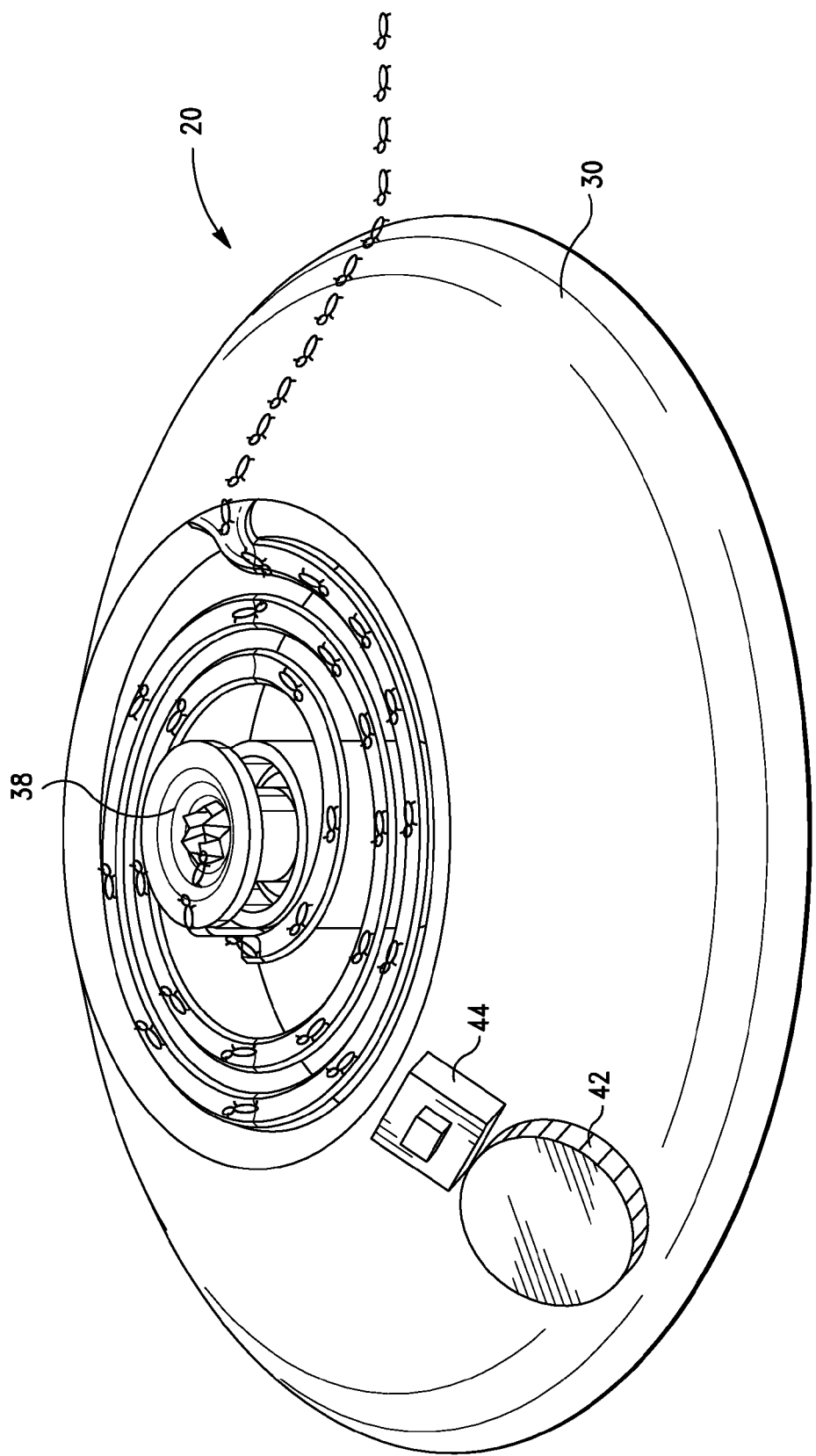

With particular reference to FIGS. 1-3, there is shown an exemplary embodiment of the ant trap denoted by the numeral 20. Illustrated in FIG. 1 is the first exemplary embodiment, which includes a base 30, an ant pathway 34 on a movable platform 36, a bait station 38 and structure for moving the platform 36, generally indicated by numeral 40 (FIGS. 2 & 3).

Additionally, the ant trap 20 includes a timer 42 and an on/off switch 44. These elements are connected to the structure 40. The structure 40 of FIGS. 1-3, includes an electromechanical lift 50 for raising and lowering the platform 36. The lift mechanism includes a motor 52, connected to a power source 54 through wires 56.

Based upon a variety of factors, timing is set for activation of the lift 50. Upon, activation, the lift 50 lowers the platform 36 toward the base 30.

As shown in FIGS. 1-3, the base 30 has a central opening 32, filled with a liquid. Typically, such a liquid is one that would be immediately harmful, even fatal, to an ant. For example, a liquid of water and sweet boric acid is preferable. This liquid is immediately harmful to the ants, while not being toxic to the environment or to mammals in the residence.

The central opening 32 if filled with, for example, with a liquid made of sweet boric acid and water. However, it will be appreciated that other liquids within the spirit and scope of the invention herein. For example, although not quite as effective, simple water will suffice.

It has also been found to be useful to sprinkle the ant path, the pathway 34 and the entire base 30 and platform 36 with powdered boric acid. Whatever ants do escape bring back healthy amounts of boric acid into the nest and often leads to a lessening of the ant population in the nest or complete eradication in some cases. All of this done without harm to humans or other mammals as well as the environment.

As shown particularly in FIG. 1, ant will fill the pathway 34 in their efforts to forage for food. Periodically, based upon the timer 42, the entire platform 36 is submerged in the liquid of the central opening 32. Ants will drown or otherwise, from the sweet boric acid solution, have their air holes clogged and similarly die. Their bodies sink to the bottom of the central opening 32, while upon signal from the timer 42, the platform 36 is raised once again and forms pathway 34 for the ants to reach the bait 60.

Although, unknown to the ants, the movable platform serves as the delivery system by which boric acid is delivered to the ants and the ants delivered to the liquid. It is well known that despite the witnessing of the lowering of such a platform, as long as there is food to forage, the ants will continue to board the platform, completely unmindful of the danger which awaits. Their programming for food is above their own need for survival.

The base 30 includes a central stanchion 37, rising from the floor 39 of the central opening 32. The stanchion 37 is suitably configured so that bait or even food can be spread out for ants and boric acid powder can be sprinkled around so that the ants must crawl through it to get to the bait. Should any ants escape the trap and return to the nest, they will bring the boric acid with them causing further destruction of the nest.

The exemplary embodiment illustrated in FIG. 3, includes a transducer 70 and a motion detector 72. The motion detector monitors activity at or near the bait. Upon the motion detector 72 sensing a high level of activity, it can be assumed that the ant pathway 34 is filled and the platform 36, is lowered.

Upon being lowered, the transducer 70 is activated. The transducer causes increased wetting of the ants and allows even more effective elimination of the ants. Obviously there are increased costs and the user will need to weigh and balance the increased effectiveness with the increased costs.

Notice that in either embodiment shown with respect to FIGS. 1-3, the stanchion portion holding the bait remains above the liquid line and thereby keeps the bait dry.

Figure 4:
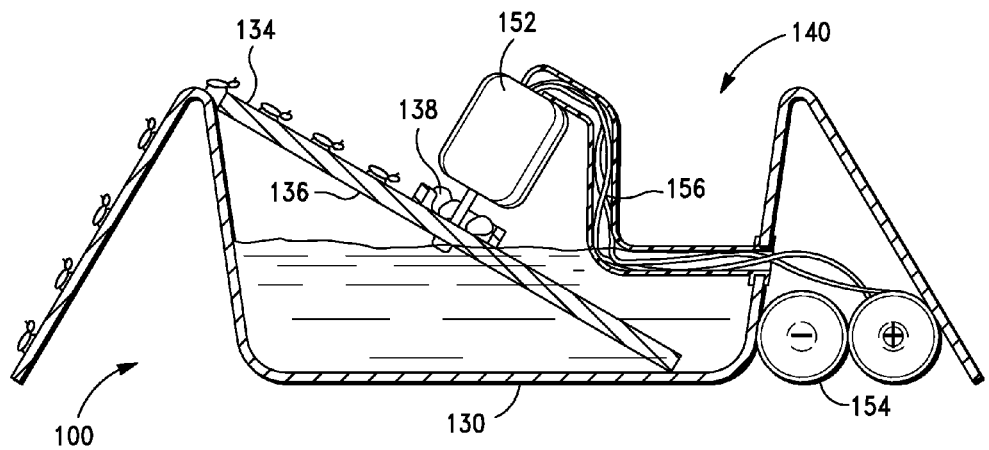
FIG. 4 illustrates another exemplary embodiment of the ant trap in accordance with this invention in cross section.

In the exemplary embodiment with respect to FIG. 4, the ant trap is generally denoted by the numeral 100. The ant trap 100 includes a base 130, an ant pathway 134 on a movable platform 136, a bait station 138 and structure for moving the platform 136, generally indicated by numeral 140.

Additionally, the ant trap 100 includes a timer (not shown) and an on/off switch (also not shown). These elements are connected to the structure 140. The structure 140 includes an electrical motor 152 for rotating the platform 136. The motor 152, is connected to a power source 154 through wires 156.

Based upon a variety of factors, timing is set for rotation of the platform 136. The platform 136 is rotated 180 degrees. Upon, activation, the platform 136 rotates leaving ants on the ant path 134 in the liquid.

The base 130 has a central opening 132, filled with a liquid. Typically, such a liquid is one that would be immediately harmful, even fatal, to an ant. For example, a liquid mixture of water and sweet boric acid is preferable. This liquid is immediately harmful to the ants while not being toxic to the environment or to humans or mammals in the residence.

The central opening 132 if filled with, for example, with a liquid made of sweet boric acid and water. However, it will be appreciated that other liquids within the spirit and scope of the invention herein. For example, although not quite as effective, simple water will suffice.

It has also been found to be useful to sprinkle the ant path, the pathway 134 and the entire base 130 and platform 136 with powdered boric acid. Whatever ants do escape bring back healthy amounts of boric acid into the nest and which often leads to a lessening of the ant population in the nest or complete eradication in some cases. Again, the objective of ant elimination is accomplished without harm to humans or other mammals or the environment.

Similarly to the exemplary embodiment illustrated in FIG. 3, the ant trap 100 in one embodiment also includes a transducer and a motion detector (not shown). The function of each of these elements is the same as that described with respect to the earlier embodiments of FIGS. 1-3.

Figure 5:
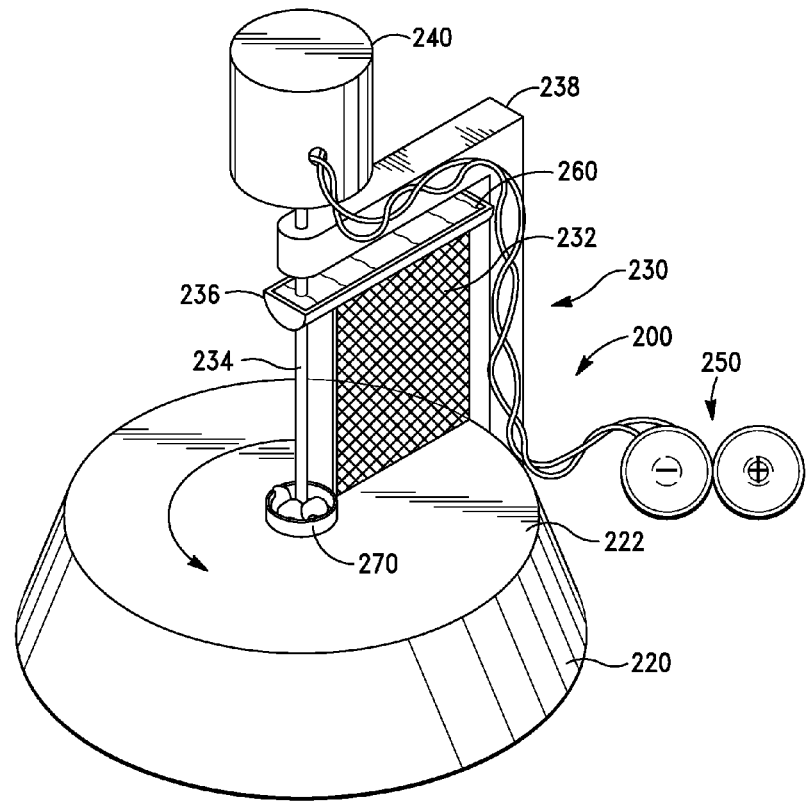
FIG. 5 illustrates another exemplary embodiment of the ant trap in accordance with this invention shown in perspective.

With respect to FIG. 5, there is shown another exemplary embodiment of the ant trap, generally denoted by the numeral 200. As with the earlier described embodiments, the FIG. 5 embodiment includes a base 220 and a platform 222.

The, ant trap 200 additionally includes a sweeper mechanism generally denoted by the numeral 230. The sweeper mechanism 230 includes a sweeper 232, an upstanding stanchion 234. The sweeper 232 is fixedly attached to an arm 236. Additionally, the arm 236 is fixedly connected to the stanchion 234.

The ant trap 200 additionally includes a support arm 238 and a motor 240 above the support arm 238 and platform 222. The support arm 238 supports the suspended motor 240. The ant trap 200 includes a power supply 250 and wires 252 connecting the power supply 250 to the motor 240.

Upon being activated, the motor 240 causes the stanchion 234 to rotate in the direction indicated by the arrow in FIG. 5. Consequently, the sweeper 232 rotates in the same direction. As the sweeper 232 rotates, ants on the platform 222 are caught in the sweeper 232.

In order to increase the effectiveness of the sweeper 232 at removing ants on the platform 222, the sweeper 232 is made from a wettable material. The material is for example a fabric as shown in FIG. 5. The material is wetted with a liquid solution that is both harmful, even fatal to the ants, while being safe for mammals and the environment. For example, the material is treated with a liquid solution of sweet boric acid.

In the exemplary embodiment of FIG. 5, the arm 238 includes a reservoir 260 of the liquid solution described above. The reservoir 260 has one or more openings (not shown) communicating directly with the fabric. The openings are quite small and as a result the liquid slowly drips onto the fabric of the sweeper 232 keeping the, sweeper 232 moist at all times.

The ant trap 200 additionally includes a bait trap, 270 mounted on the central portion of the platform. In the embodiment shown, the bait trap 270 is located where the stanchion 234 connects to the platform 222.

Figure 6:
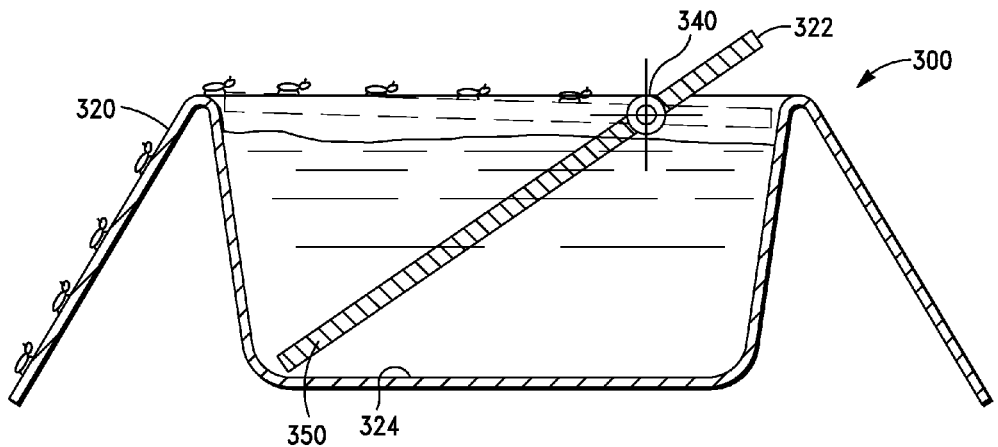
FIGS. 6 & 7 illustrate another exemplary embodiment of the ant trap in accordance with this invention.
Figure 7:
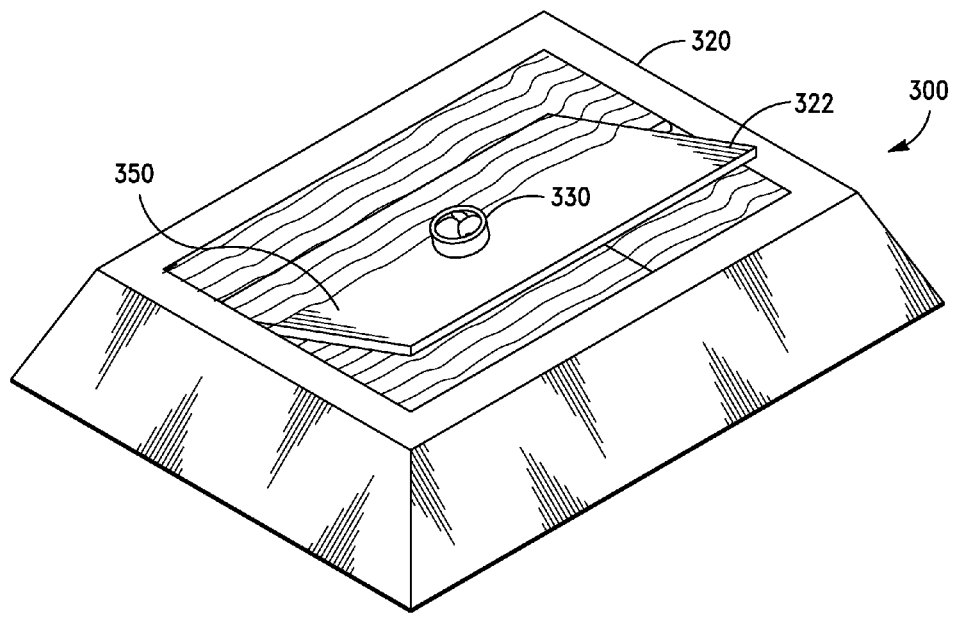

With respect to FIGS. 6 and 7, there is shown another exemplary embodiment of the ant trap generally denoted by the numeral 300. As described with regard to the earlier embodiments, the ant trap 300 includes a base 320 and a rotatable platform 322. The base 320 in this embodiment is generally rectangular and has a central opening 324. The central opening 324 stores a liquid, as described above.

The platform 322 acts as a rocker platform. The platform 322 includes pivot points 340. The pivot points 340 are located toward one of the base 320. The platform is lightweight and is delicately balanced.

The platform 322 includes a bait trap 330. The bait trap 330 is positioned on the platform 322 to balance the platform and to create a situation where the maximum number of ants are on the "dipping" side 350 of the platform. Upon a sufficient number of ants on the dipping side 350, the delicate balance is disturbed and the dipping side 350 dips into the liquid with the results previously described above. The liquid is as described with respect to the earlier embodiments.

Figure 8:
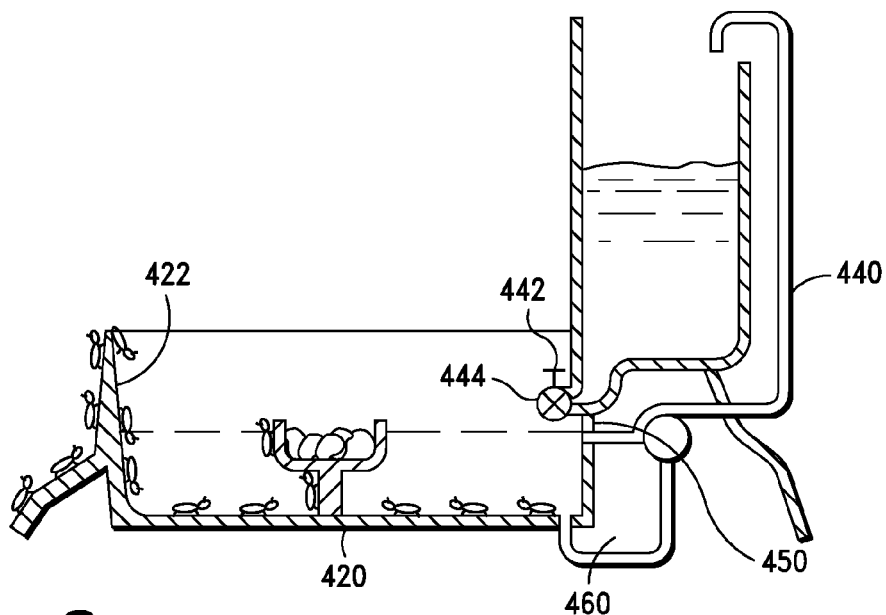
FIGS. 8 & 9 illustrate another exemplary embodiment of the ant trap in accordance with this invention.
Figure 9:
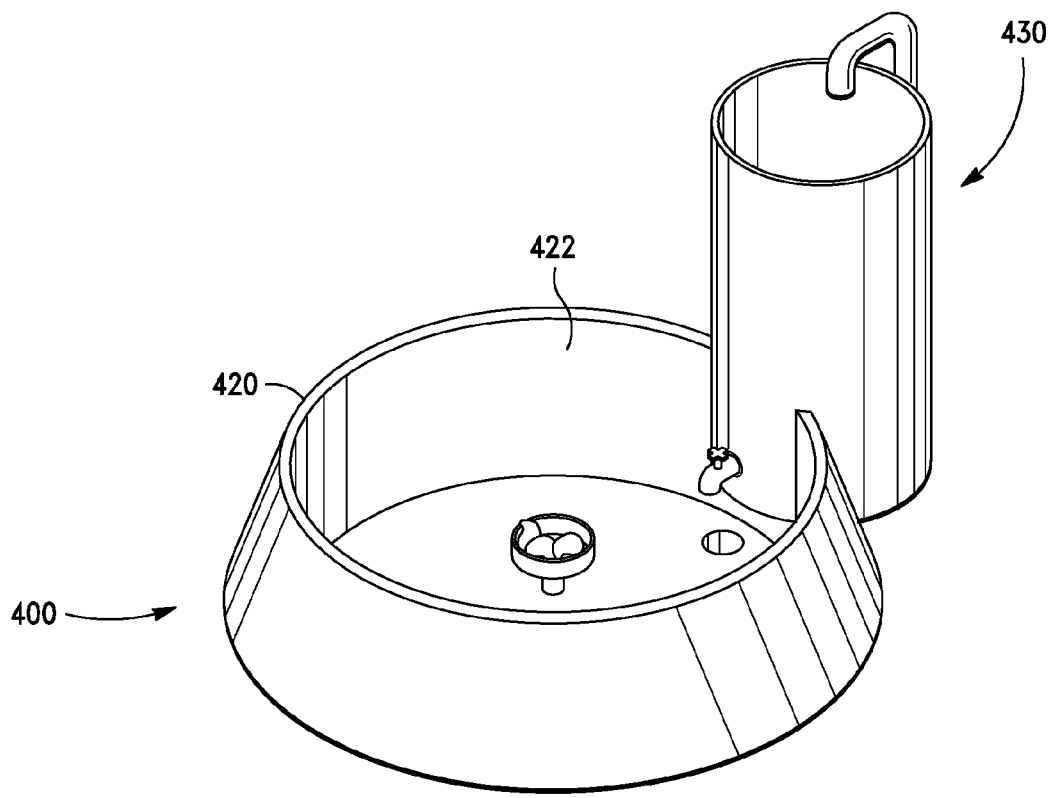

With respect to FIGS. 8 and 9, there is shown another exemplary embodiment of the ant trap, generally denoted by the numeral 400. The ant trap 400 includes a base 420 having a central opening 422. Attached to the base 420 is a reservoir mechanism, generally denoted by the numeral 430.

The reservoir mechanism 430 includes a reservoir tank 440 attached to the base 420. The tank 440 includes an outflow valve 442 operated by a solenoid 444. Wires 446 connect the solenoid with a power source. Liquid of the type earlier described fills the tank 440.

The ant trap 400 includes a bait trap 448, centrally located in the central opening 422 to attract the maximum number of ants into the central opening 422.

In one exemplary embodiment, a timer (not shown) similar to the timer shown in FIGS. 1-3 is connected the solenoid. Periodically, the solenoid releases the liquid in the reservoir tank 440. The liquid floods the centrally opening terminating the ants found therein.

The ant trap 400 includes a pump (not shown). The pump is activated to drain the water from the central opening 442 through outlet 450, which opens upon activation of the pump. The ant-laden water is pumped through the outlet 450 and the return water is pumped back into the tank 440. Since the dead ant don't float, their bodies fall into a collection area 460. The collection is manually cleaned as needed.

While the foregoing detailed description has described several, exemplary embodiments of the ant trap in accordance with this invention, it is to be understood that the above description is illustrative only and not limiting of the disclosed invention. Thus, the invention is to be limited only by the claims as set forth below.

What is claimed is:

1. An improved ant trap, comprising:
   a base with outside walls and having a central opening and the central opening being generally equi-distance from the outside walls and being suitable for storing liquid, the base includes an upstanding stanchion centrally located in the central opening and wherein the bait trap is placed upon the top of the stanchion,
   a bait trap located within the central opening; and
   a platform and a lift mechanism, the platform movable with respect to the central opening, in a first position the platform forms an ant path from the base to the bait trap, and in a second position the platform is immersed in liquid stored within the central opening, the platform being connected to the lift mechanism for selectively moving the platform into the central opening and returning the platform to its first position;
   whereby upon filling the central opening with a liquid and upon selectively moving the platform into the liquid the ant path immersed in the liquid for exterminating ants and thereby, upon moving the platform into the central opening, when the central opening is filled with liquid, the bait trap stays dry.

2. The ant trap as set forth in claim 1, wherein the liquid is toxic to ants and safe to the environment and mammals.

3. The ant trap as set forth in claim 1, wherein the liquid is a solution of water and sweet boric acid powder.

4. The ant trap as set forth in claim 1, wherein the lift mechanism includes a timer for selectively moving the platform into the central opening and returning the platform to its first position.

5. The ant trap as set forth in claim 1, wherein the platform is lowered into the central opening.

6. The ant trap as set forth in claim 1, wherein the lift mechanism is operated by an electrical motor.

* * * * *